(12) United States Patent
Zhao et al.

(10) Patent No.: US 12,469,782 B2
(45) Date of Patent: Nov. 11, 2025

(54) EQUALIZATION CIRCUIT STRUCTURE AND MANUFACTURING METHOD THEREOF, SENSE AMPLIFICATION CIRCUIT STRUCTURE AND MEMORY CIRCUIT STRUCTURE

(71) Applicant: CHANGXIN MEMORY TECHNOLOGIES, INC., Hefei (CN)

(72) Inventors: Yang Zhao, Hefei (CN); Jaeyong Cha, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 819 days.

(21) Appl. No.: 17/661,548

(22) Filed: Apr. 29, 2022

(65) Prior Publication Data

US 2023/0223338 A1  Jul. 13, 2023

(30) Foreign Application Priority Data

Jan. 10, 2022 (CN) .......................... 202210022775.3

(51) Int. Cl.
| | | |
|---|---|---|
| *H01L 23/52* | (2006.01) | |
| *G11C 7/06* | (2006.01) | |
| *G11C 7/12* | (2006.01) | |
| *H01L 23/528* | (2006.01) | |
| *H01L 23/538* | (2006.01) | |
| *H10D 84/01* | (2025.01) | |

(Continued)

(52) U.S. Cl.
CPC .............. *H01L 23/528* (2013.01); *G11C 7/06* (2013.01); *G11C 7/12* (2013.01); *H01L 23/538* (2013.01); *H10D 84/0126* (2025.01); *H10D 84/038* (2025.01); *H10D 84/83* (2025.01)

(58) Field of Classification Search
CPC ................. H01L 23/528; H01L 23/538; H01L 21/76895; H01L 23/485; H01L 23/5286; H01L 23/5226; H01L 23/5283; H01L 23/5386; G11C 7/06; G11C 7/12; G11C 5/025; G11C 11/4091; G11C 11/4094; H10D 84/0126; H10D 84/038; H10D 84/83; H10D 84/0186; H10D 84/85; H10D 89/10; H10B 12/50
USPC ........................................................ 257/368
See application file for complete search history.

(56) References Cited

U.S. PATENT DOCUMENTS

| | | | | |
|---|---|---|---|---|
| 6,483,139 | B1* | 11/2002 | Arimoto ............. | G11C 11/4076 257/295 |
| 2007/0052028 | A1* | 3/2007 | Hidaka ................. | H10D 86/01 257/351 |
| 2021/0056906 | A1* | 2/2021 | Lee ........................ | H10K 59/60 |

FOREIGN PATENT DOCUMENTS

| | | | | |
|---|---|---|---|---|
| CN | 1206917 A | | 2/1999 | |
| TW | 201503122 A | * | 1/2015 | ......... G11C 11/4094 |

OTHER PUBLICATIONS

First Office Action of the Taiwanese application No. 111133381, issued on Jul. 11, 2023. 6 pages with English abstract.

* cited by examiner

*Primary Examiner* — Mohammad M Hoque
(74) *Attorney, Agent, or Firm* — Syncoda LLC; Feng Ma

(57) ABSTRACT

An equalization circuit structure includes a semiconductor substrate including an equalization active region; a gate layer including a gate pattern and a power supply line, wherein the gate pattern is disposed on the equalization active region and configured for forming a transistor unit with the equalization active region, and the power supply line electrically connects the equalization active region with (Continued)

an external power supply and is configured for supplying power to the transistor unit.

14 Claims, 6 Drawing Sheets

(51) Int. Cl.
*H10D 84/03* (2025.01)
*H10D 84/83* (2025.01)

EQUALIZATION CIRCUIT STRUCTURE AND MANUFACTURING METHOD THEREOF, SENSE AMPLIFICATION CIRCUIT STRUCTURE AND MEMORY CIRCUIT STRUCTURE

CROSS-REFERENCE TO RELATED APPLICATION

The application claims priority to Chinese Patent Application No. 202210022775.3 filed on Jan. 10, 2022, the disclosure of which is hereby incorporated herein by reference in its entirety.

BACKGROUND

When a logic level stored at a memory cell is read, a sense amplification circuit is usually required to amplify and read signals on a bit line and a complementary bit line connected to the memory cell. An equalization circuit is an important part of the sense amplification circuit. In the pre-charge phase of the reading process, respective transistors in the equalization circuit are turned on so that the bit line has the same intermediate level as the complementary bit line. In a conventional sense amplification circuit structure, a trace layer is usually provided, so that traces (including a power supply line of the equalization circuit) are provided through the trace layer.

However, with the development of the manufacturing process, sizes of the transistors become increasingly small while the number of traces remains unchanged. It thus becomes increasingly difficult to reduce the size of the traces and to manufacturing a trace layer accommodating multiple traces within a limited area.

SUMMARY

The present disclosure relates to the technical field of integrated circuits, and in particular to an equalization circuit structure and a manufacturing method thereof, a sense amplification circuit structure and a memory circuit structure.

Based on the above, embodiments of the present disclosure provide an equalization circuit structure and a manufacturing method thereof, a sense amplification circuit structure and a memory circuit structure.

There is provided an equalization circuit structure, including: a semiconductor substrate including an equalization active region; and a gate layer including a gate pattern and a power supply line, wherein the gate pattern is disposed on the equalization active region and configured for forming a transistor unit with the equalization active region, and the power supply line electrically connects the equalization active region with an external power supply and is configured for supplying power to the transistor unit.

There is provided a method for manufacturing an equalization circuit structure, including: a semiconductor substrate with an equalization active region is provided; and a gate layer including a gate pattern and a power supply line is formed on the equalization active region, wherein the gate pattern is configured for forming a transistor unit with the equalization active region, and a power supply line electrically connects the equalization active region with an external power supply and is configured for supplying power to the transistor unit.

BRIEF DESCRIPTION OF THE DRAWINGS

In order to illustrate the embodiments of the present disclosure or the technical solutions in the conventional art more clearly, the accompanying drawings required for use in the description of the embodiments or the conventional technology will be briefly described below. It is apparent that the accompanying drawings in the following description are merely some embodiments of the present disclosure and a person having ordinary skill in the art can obtain other drawings according to these drawings without paying the premise.

Figure 1:
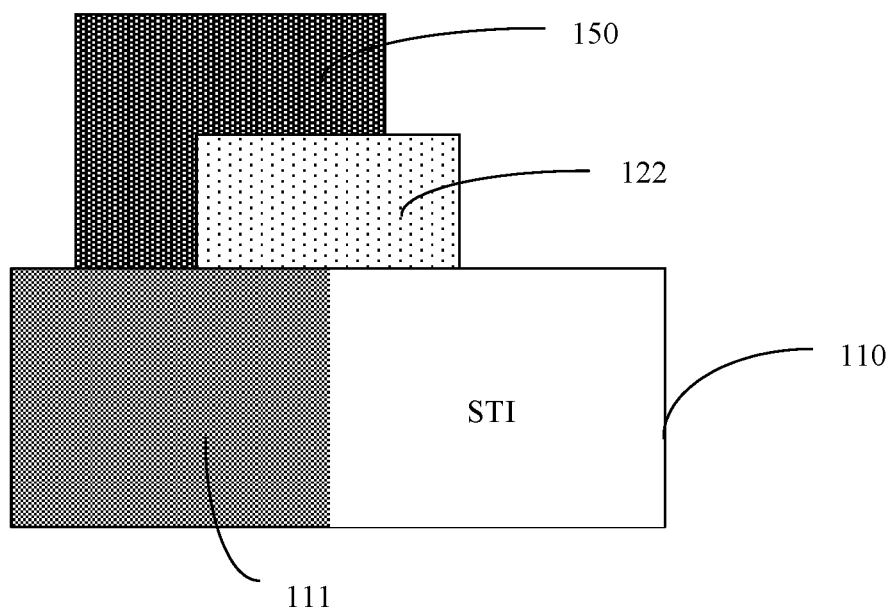
FIG. 1 is a schematic cross-sectional view of an equalization circuit structure according to an embodiment.

List of reference signs: 100—equalization circuit structure, 110—semiconductor substrate, 111—equalization active region, 1111—first active region, 1112—second active region, 1113—central active region, 120—gate layer, 121—gate pattern, 122—power supply line, 130—gate dielectric layer, 140—trace layer, 141—first trace, 142—second trace, 143—bit line, 150—interconnection structure, 160—first dielectric layer, 170—second dielectric layer, 180—sidewall protection layer, 211—first N—type active region, 221—second N—type active region, 231—first P-type active region, 241—second P-type active region, 212—first gate, 222—second gate, 232—third gate, 242—fourth gate, 10—sense amplification circuit structure, 20—memory cell.

DETAILED DESCRIPTION

To facilitate understanding of the present disclosure, the present disclosure will be described more fully below with reference to the accompanying drawings. Embodiments of the present disclosure are shown in the drawings. However, the present disclosure may be implemented in many different forms, and is not limited to the embodiments described herein. On the contrary, these embodiments are provided for the purpose of making the disclosure of the present disclosure more thorough and comprehensive.

Unless otherwise defined, all technical and scientific terms used herein have the same meanings as generally understood by those skilled in the art of the present disclosure. The terms used herein in the specification of this disclosure are for the purpose of describing specific embodiments only and are not intended to limit this disclosure.

It is to be appreciated that when an element or layer is referred to as "on", "adjacent to", "connect to" or "coupled to" other elements or layers, which may be directly on, adjacent to, connected to, or coupled to other elements or layers, or there may be intermediate elements or layers. On the contrary, when the element is referred to as "directly on", "directly adjacent to", "directly connect to" or "directly coupled to" other elements or layers, there is no intermediate elements or layers.

It will be understood that the "connection" in the following embodiment should be understood as "electrically connection" when there are electrical signals or data passing through the connected circuits, units, etc.

It is to be appreciated that although the terms "first", "second", "third" and the like may be used to describe various elements, components, regions, layers, doping types, and/or parts, these elements, components, regions, layers, doping types, and/or parts should not be limited by these terms. These terms are used only to distinguish one element, component, region, layer, doping type or part from another element, component, region, layer, doping type or part. Thus, the first element, component, region, layer, doping type, or part discussed below may be represented as a second element, component, region, layer, or part without departing from the teachings of the present disclosure.

Spatial relation terms such as "under", "below", "on", "above", "over" and the like may be used herein to describe the relationship of one element or feature shown in the figure to other elements or features. It is to be appreciated that, in addition to the orientation shown in the figure, spatial relationship terms also include different orientations of devices in use and in operation. For example, when the device in the figure flips, the orientation of the component or feature described as "under other component" or "below other component" will be "above" other components or features. . Thus, the exemplary term "under" and "below" may include both up and down orientations. Further, the device may also include additional orientation (e.g., 90 degrees rotation or other orientation), and the spatial descriptors used herein are explained accordingly.

As used herein, the articles "a" and "an" are intended to include one or more items, unless explicitly stated otherwise. It is understood that the terms "include/comprise" or "has/have" or the like specifies the presence of the stated features, totals, steps, operations, components, parts, or combinations thereof, but not rule out the possibility of the presence or addition of one or more other features, totals, steps, operations, components, parts, or combinations thereof.

Embodiments of the disclosure are described herein with reference to cross-sectional views which are schematic diagrams of exemplary embodiments of the present disclosure, whereby variations in the shown shape due to, for example, manufacturing techniques and/or tolerances may be contemplated. However, embodiments of the present disclosure should not be limited to the specific shapes of the areas shown herein.

Figure 6:
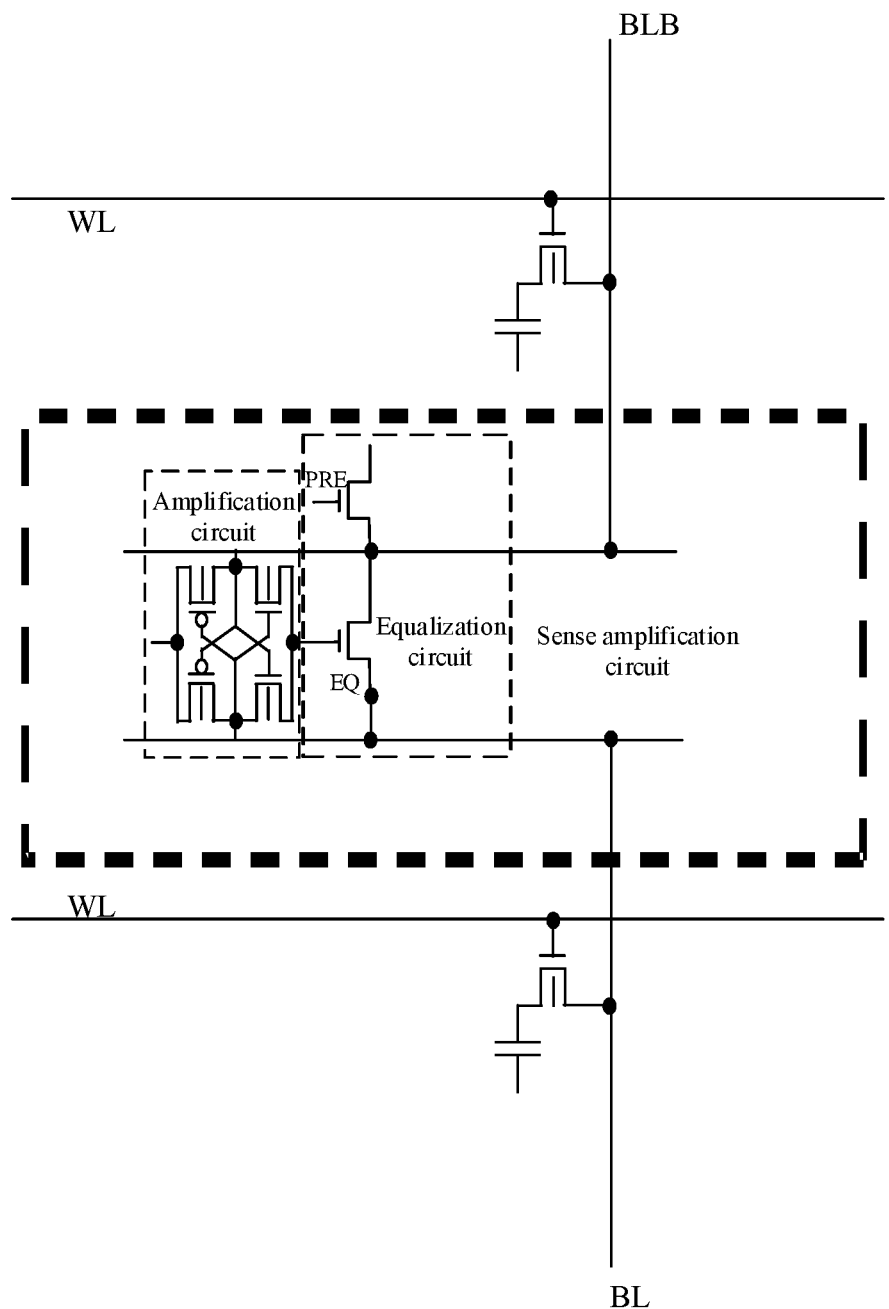
FIG. 6 is a schematic diagram of a conventional sense amplification circuit.

As described in the background section, when a logic level stored at a memory cell is read, a sense amplification circuit is usually required to amplify and read signals on a bit line and a complementary bit line connected to the memory cell. Referring to FIG. 6, the sense amplification circuit generally includes an equalization circuit and an amplification circuit. The sense amplifying circuit is used to amplify the signals on the bit line BL and the complementary bit line BLB. Equalization circuitry typically includes a pre-charge transistor and an equalization transistor. The gate of the pre-charge transistor receives a pre-charge signal PRE to turn on the pre-charge transistor. The equalization transistor gate receives an equalization signal EQ to turn on the equalization transistor. The source and drain of the equalization transistor are connected with the bit line BL and the complementary bit line BLB respectively. Furthermore, one or both of the bit line BL and the complementary bit line BLB may be electrically connected to the pre-charge transistor. When the sense amplification circuit is operating, the pre-charge signal PRE and the equalization signal EQ are typically provided at the same time, thus equalizing the level of the bit line BL and the level of the complementary bit line BLB, and maintaining the level at the pre-charge level.

The sense amplification circuit structure involves more devices. When the sense amplification circuit structure is applied to a memory circuit, to save area, each transistor is vertically arranged between four memory cells in the lateral direction, and four sense amplification circuit structures are disposed between upper and lower memory cells. In this case, there are at least seven traces passing through a device surface layer of the equalization circuit structure. However, with the reduction of the transistor size in the circuit, it is unable to form seven traces by using existing trace manufacturing techniques such as self-aligning double imaging (SADP) techniques.

Based on the above, embodiments of the present disclosure provide an equalization circuit structure and a manufacturing method thereof, a sense amplification circuit structure and a memory circuit structure. However, it is to be understood that the equalization circuit in the embodiment of the present disclosure can be, but not limited to, an equalization circuit in the sense amplification circuit; and the sense amplification circuit can be, but not limited to, a sense amplification circuit in a storage circuit.

Figure 2:
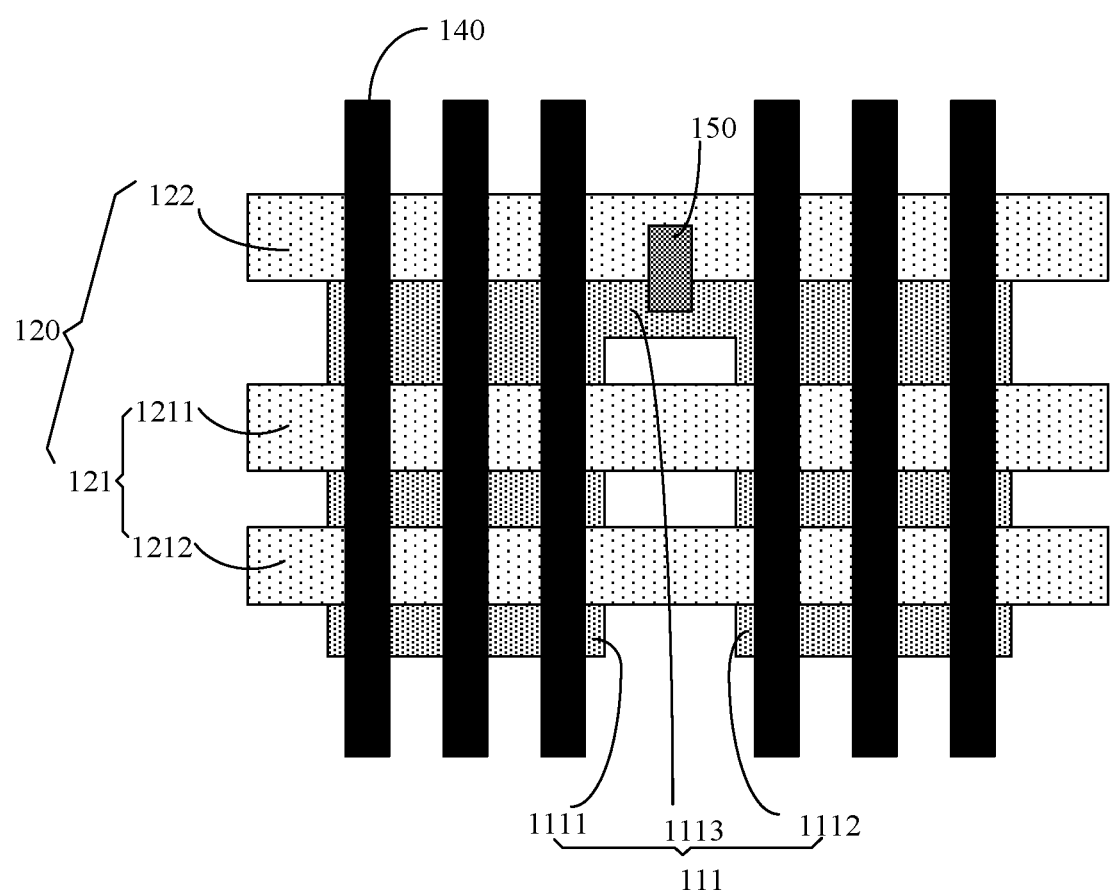
FIG. 2 is a schematic top view of an equalization circuit structure according to an embodiment.

In an embodiment, referring to FIG. 1 and FIG. 2, an equalization circuit structure 100 is provided. The equalization circuit structure 100 includes a semiconductor substrate 110 and a gate layer 120.

The semiconductor substrate 110 includes an equalization active region 111. Specifically, the semiconductor substrate 110 may have a well region formed by ion doping. The well region may be isolated into multiple active regions by a shallow trench isolation (STI) structure. The equalization active region 111 may be one of the active regions.

The gate layer 120 includes a gate pattern 121 and a power supply line 122. As an example, the gate pattern 121 and the power supply line 122 may be disposed in parallel, thereby facilitating design and processing. Of course, the two lines may not be parallel, but do not intersect or overlap with each other.

The gate pattern 121 is disposed on the equalization active region 111 and configured for forming a transistor unit with the equalization active region 111. The number of the gate patterns 121 may be one or more, which is not limited herein, and is specifically determined according to the number and shape of the transistors required. The power supply line 122 electrically connects the equalization active region 111 with an external power supply (not shown) and is configured for supplying power to the transistor unit.

Specifically, the transistor unit may include a pre-charge transistor. The gate pattern 121 may include a pre-charge gate 1211, and the pre-charge gate 1211 is configured for forming a pre-charge transistor with the equalization active region 111. One of the source and drain of the pre-charge transistor may be electrically connected with an external power supply to obtain power voltage. The other one of the source and drain of the pre-charge transistor may be electrically connected to a bit line in the memory circuit structure.

Further, the transistor unit may further include an equalization transistor. The gate pattern 121 may include an equalization gate 1212, and the equalization gate 1212 is configured for forming an equalization transistor with the equalization active region 111. The source and drain of the equalization transistor may be electrically connected respectively to two bit lines in the memory circuit structure which are complementary to each other, and the two bit lines which are complementary to each other may be referred to as a bit line BL and a complementary bit line BLB, respectively.

As an example, the equalization circuit structure 100 may include two transistor units that share the power supply line 122.

Specifically, the equalization active region 111 of the semiconductor substrate 110 may include a first active region 1111, a second active region 1112, and an central active region 1113 connecting the first active region 1111 and the second active region 1112, and the central active region 1113 is further disposed at one end of the first active region 1111 and the second active region 1112.

In each of the gate patterns 121 of the gate layer 120, one same gate pattern 121 may cross over the first active region 1111 and the second active region 1112 to form different transistors with the first active region 1111 and the second active region 1112.

Each gate pattern 121 may form a transistor unit with the first active region 1111 while each gate pattern 121 forms another transistor unit with the second active region 1112. Herein, it is understood that each transistor unit may further include a gate dielectric layer disposed between the first active region 1111 and the gate pattern 121 and between the second active region 1112 and the gate pattern 121.

Furthermore, the power supply line 122 may be electrically connected to the central active region 1113 so as to simultaneously supply power to the transistor units on both sides through the central active region 1113.

The pre-charge transistor and the equalization transistor of the each transistor unit are turned on simultaneously, so that the bit line BL and the complementary bit line BLB corresponding to the transistor unit may have the same pre-charge level.

In the equalization circuit structure of this embodiment, the power supply line 122 is disposed in the gate layer 120 where the gate pattern 121 is disposed, so that the power supply line 122 is connected and extended outwards through the gate layer 120. Therefore, according to embodiment, it is possible to effectively reduce the number of traces of the trace layer 140, thereby effectively saving the area of the trace layer 140, and effectively reducing the difficulty in the manufacturing process of the trace layer 140.

Specifically, as an example, the trace layer 140 may be disposed over the gate layer 120. The trace layer 140 may be provided with other traces.

Figure 3:
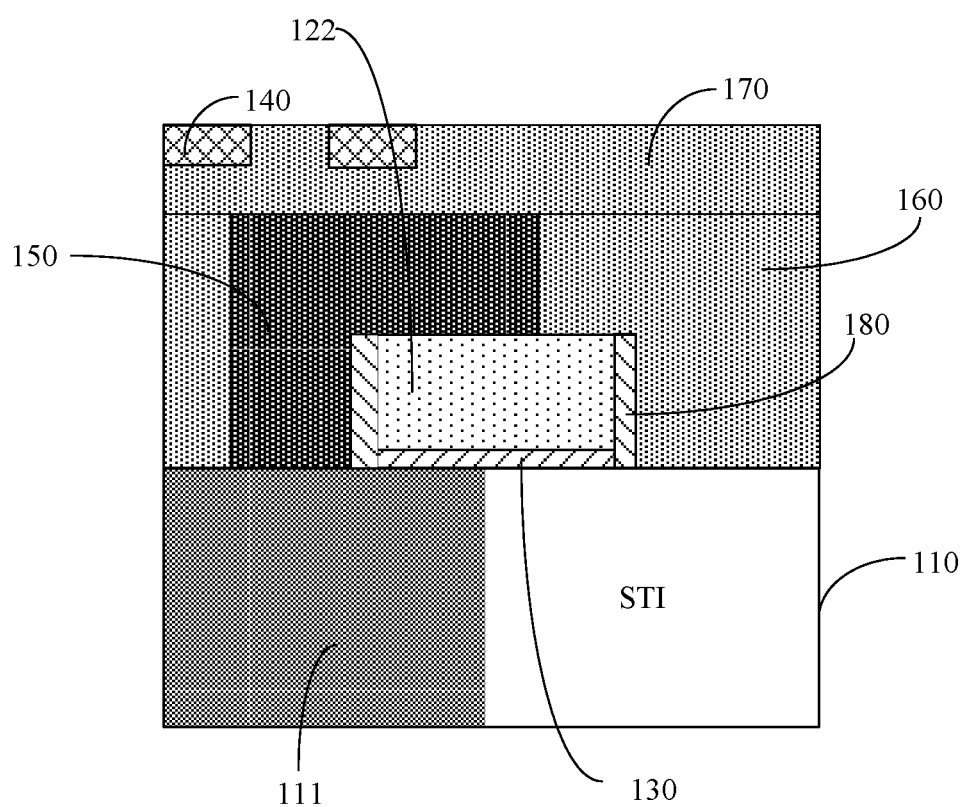
FIG. 3 is a schematic cross-sectional view of an equalization circuit structure according to another embodiment.

In an embodiment, referring to FIG. 1 or FIG. 3, the equalization circuit structure further includes an interconnection structure 150 connected with both the power supply line 122 and the equalization active region 111. The equalization active region 111 is specifically a source or drain of a pre-charge transistor, which is formed by ion doping.

In this case, the power supply line 122 can be effectively connected electrically to the equalization active region 111 through the interconnection structure 150.

In an embodiment, referring to FIG. 3, the equalization circuit structure further includes a first dielectric layer 160. The first dielectric layer 160 covers the semiconductor substrate 110 and the gate layer 120.

Furthermore, a contact hole is disposed within the first dielectric layer 160. The interconnection structure 150 is disposed within the contact hole so as to be connected with both the power supply line 122 and the equalization active region 111.

In this embodiment, by formation of the first dielectric layer 160 and formation of the contact hole in the first dielectric layer 160, the interconnection structure 150 can be in contact with the upper surface of the power supply line 122 and the upper surface of the equalization active region 111 at the same time, so that the two can be electrically connected effectively.

In an embodiment, still referring to FIG. 3, the equalization circuit structure further includes a second dielectric layer 170. The second dielectric layer 170 covers the first dielectric layer 160 and the interconnection structure 150.

In this case, the second dielectric layer 170 and the first dielectric layer 160 may together enclose the interconnection structure 150 and the gate layer 120, so that effective passivation protection for the interconnection structure 150 and the gate layer 120 is enabled.

In an embodiment, still referring to FIG. 3, the equalization circuit structure further includes a trace layer 140. The trace layer 140 includes multiple traces 410 on the second dielectric layer 170.

As an example, multiple grooves may be formed in the second dielectric layer 170, and individual traces of the trace layer 140 may be disposed within the grooves. Of course, no groove may be formed in the second dielectric layer 170. In this case, the patterned trace layer 140 may be directly disposed on the second dielectric layer 170.

The trace layer 140 is disposed on the second dielectric layer 170 so as to be insulated and isolated from the interconnection structure 150 and the gate layer 120 by the second dielectric layer 170, so that the lines therebetween do not interfere with each other.

In an embodiment, referring to FIG. 1 or FIG. 3, the semiconductor substrate further includes a STI structure. The power supply line 122 is disposed partially on the equalization active region 111 and partially on the STI structure connected with the equalization active region 111.

In this case, the area in the active region 111, which occupied by the power supply line 122 and the interconnection structure 150, can be effectively reduced, thereby facilitating the manufacturing of the transistor.

Furthermore, in the actual process for the circuit structure, there is no clear boundary between the active region 111 and the STI structure, and a small amount of doped ions will diffuse from the active region 111 to the STI structure. Therefore, a small amount of doping ions may be present on the side of the STI structure near the active region 111. Therefore, if the interconnection structure 150 is in contact with this side of the STI structure, diffused ions in the STI structure may form a conductive path between the interconnection structure 150 and the well region below the STI structure, thereby causing leakage.

In this embodiment, the power supply line 122 is partially disposed on the equalization active region 111 and partially disposed on the STI structure connected with the equalization active region 111. Therefore, the interconnection structure 150 is not in contact with the STI structure, thereby effectively avoiding leakage between the gate layer 120 (specifically, the power supply line 122) and the well region below the STI structure.

Of course, in other embodiments, the power supply line 122 may be disposed entirely on the equalization active region 111. Alternatively, the power supply line 122 may be disposed entirely on the STI structure. This is not limited herein.

In an embodiment, referring to FIG. 3, the equalization circuit structure further includes a gate dielectric layer 130. The gate dielectric layer 130 is disposed between the gate pattern 121 and the semiconductor substrate 110 and between the power supply line 122 and the semiconductor substrate 110.

In this case, in the process of manufacturing the equalization circuit structure, a gate dielectric material layer may be firstly deposited on the semiconductor substrate 110, and then a gate material layer may be formed on the gate dielectric material layer. Then, the gate material layer and the gate dielectric material layer are patterned to form the power supply line 122, the gate pattern 121 and the gate dielectric layer 130 below the aforementioned two elements. In this case, the power supply line 122 and the gate pattern 121 are manufactured using the same process, thereby effectively reducing the process complexity.

Of course, in other embodiments, there may not be the gate dielectric layer 130 formed between the power supply line 122 and the semiconductor substrate 110. In this case, specifically, after the gate dielectric material layer is formed, a patterning process may be performed to remove the gate dielectric material layer below the power supply line 122.

In some embodiments, the interconnection structure 150 may not be disposed within the first dielectric layer 160. For example, the interconnection structure 150 may be disposed within the gate dielectric layer 130. In this case, the equalization active region 111 below the gate dielectric layer 130 may be provided as a heavily doped active region with good conductivity.

In an embodiment, referring to FIG. 3, the equalization circuit structure further includes a sidewall protection layer 180. The sidewall protection layer 180 is disposed on both sides of each of the gate pattern 121 and the power supply line 122, and the sidewall protection layer 180 can protect the gate pattern 121 and the power supply line 122 from damage caused by the heavy doping process and further reduce the process complexity.

Specifically, during the process of manufacturing the equalization circuit structure, after the power supply line 122, the gate pattern 121 and the gate dielectric layer 130 are formed, a sidewall material layer may be formed on the power supply line 122, the gate pattern 121 and the semiconductor substrate 110. Then, the sidewall material layer on the upper surfaces of the power supply line 122, the gate pattern 121 and the semiconductor substrate 110 are removed by anisotropic etching. The sidewall material layer remaining on side walls of the power supply line 122 and the sidewall of the gate pattern 121 form the sidewall protection layer 180.

After the sidewall protection layer 180 is formed, the equalization active region 111 outside the power supply line 122 and the gate pattern 121 may be heavily doped so that this part of the equalization active region 111 has conductive property.

Of course, in other embodiments, the sidewall protection layers 180 on both sides of the power supply line 122 may also be removed.

In an embodiment, referring to FIG. 1, the power supply line 122 contacts with the equalizing active region 111.

Specifically, at least a part of the power supply line 122 may be directly formed on the central active region 1113 so as to be in contact with the central active region 1113.

In this case, the interconnection structure 150 may or may not be formed in the equalization circuit structure.

When the interconnection structure 150 is not formed in the equalization circuit structure, the central active region 1113 may be heavily doped before the gate layer 120 is formed. After the gate layer 120 is formed, the first active region 1111 and the second active region are heavily doped. In this case, the power supply line 122 and the equalization active region 111 can be electrically connected effectively.

In an embodiment, the gate layer 120 includes a polysilicon layer, and the power supply line 122 is disposed within the polysilicon layer. It will be appreciated that the polysilicon layer in this case is a conductive polysilicon layer, which may be a doped polysilicon layer.

In an embodiment, referring to FIG. 3, an equalization circuit structure 100 is provided. The equalization circuit structure 100 includes a semiconductor substrate 110, a gate dielectric layer 130, a gate layer 120, a sidewall protection layer 180, a first dielectric layer 160, an interconnection structure 150, a second dielectric layer 170 and a trace layer 140.

The semiconductor substrate 110 includes an equalization active region 111. The gate dielectric layer 130 is disposed on the equalization active region 111. A gate layer 120 is formed on the gate dielectric layer 130, including a gate pattern 121 and a power supply line 122. The gate pattern 121, the gate dielectric layer 130 and the equalization active region 111 form a transistor unit. The power supply line 122 electrically connects the equalization active region 111 with an external power supply for supplying power to the transistor unit. The sidewall protection layer 180 is disposed on the sidewalls of the gate layer 120 and the gate dielectric layer 130. The first dielectric layer 160 covers the semiconductor substrate 110, the sidewall protection layer 180 and the gate layer 120, and a contact hole is disposed within the first dielectric layer 160. The contact hole may expose a part of the gate layer 120 and a part of the equalization active region 111. The interconnection structure 150 is disposed within the contact hole. The second dielectric layer 170 covers the interconnection structure 150, the sidewall protection layer 180, and the first dielectric layer 160. The trace layer 140 is formed on the second dielectric layer 170 and may include several traces.

Figure 4:
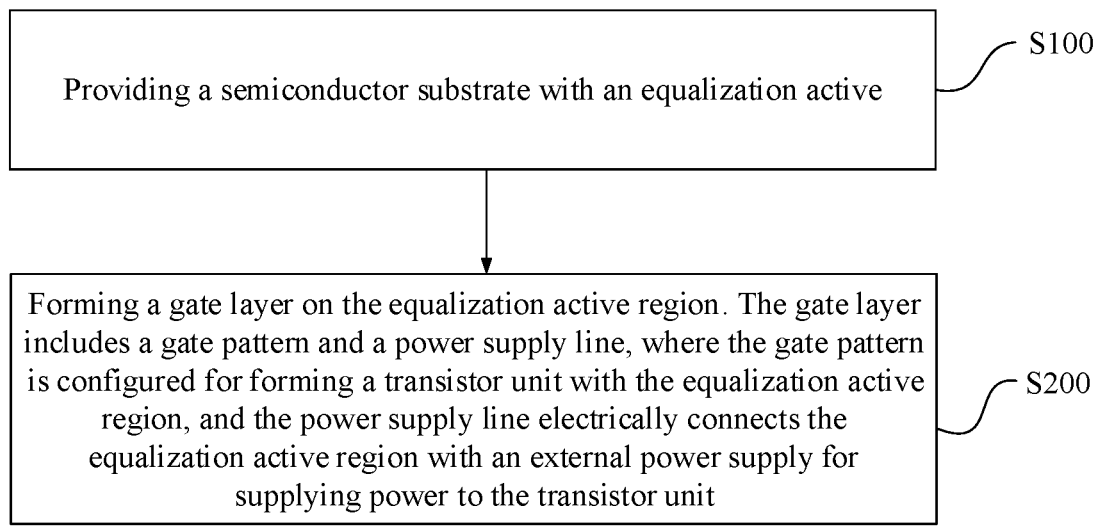
FIG. 4 is a flowchart of a method for manufacturing an equalization circuit structure according to an embodiment.

In an embodiment, referring to FIG. 4, a method for manufacturing an equalization circuit structure 100 is further provided that includes operations S100 and S200.

In operation S100, a semiconductor substrate 110 with an equalization active region 111 is provided.

In operation S200, a gate layer 120 is formed on the equalization active region 111. The gate layer 120 includes a gate pattern 121 and a power supply line, where the gate pattern is configured for forming a transistor unit with the equalization active region 111, and the power supply line 122 electrically connects the equalization active region 111 with an external power supply for supplying power to the transistor unit, with reference to FIG. 1 and FIG. 2.

In operation S100, the semiconductor substrate 110 may be formed through the following process. A semiconductor base substrate (such as a silicon substrate) is provided; then, the semiconductor base substrate is lightly doped to form a well region. An STI structure is formed in the well region. The STI structure isolates the well region into multiple active regions. The equalization active region 111 may be one of the active regions.

In operation S200, the gate layer 120 may include a polysilicon layer. The gate pattern 121 and the power supply line 122 of the gate layer 120 are formed at different positions of the equalization active region 111, respectively.

After the gate pattern 121 and the power supply line 122 are formed, the uncovered active region 111 is heavily doped to form the source or drain of the equalization circuit transistor.

In the method of this embodiment, the power supply line 122 is formed within the gate layer 120 where the gate pattern 121 is disposed, so that the power supply line 122 is connected and extended outwards through the gate layer 120. Therefore, according to embodiment, it is possible to effectively reduce the number of traces of the trace layer 140, thereby effectively saving the area of the trace layer 140, and effectively reducing the difficulty in the manufacturing process of the trace layer 140.

In an embodiment, the method for manufacturing an equalization circuit structure further includes an operation S300.

In operation S300, an interconnection structure 150 is formed, and the interconnection structure 150 is connected with both the power supply line 122 and the equalization active region 111.

In an embodiment, operation S300 includes operations S310 to S330.

In operation S310, a first dielectric layer 160 is formed on the semiconductor substrate 110 and the gate layer 120.

In operation S320, a contact hole is formed in the first dielectric layer 160.

In operation S330, the interconnection structure 150 is formed in the contact hole, with reference to FIG. 3.

In an embodiment, S330 is followed by operation S400.

In operation S400, a second dielectric layer 170 is formed on the first dielectric layer 160 and the interconnection structure 150, with reference to FIG. 3.

In an embodiment, S400 is followed by operation S500.

In operation S500, a trace layer 140 is formed on the second dielectric layer 170. The trace layer 140 includes multiple traces, with reference to FIG. 3.

In an embodiment, a manufacturing method of equalization circuit structure 100 is provided that includes operations S1 to S8.

In operation S1, a semiconductor substrate 110 with an equalization active region 111 is provided.

In operation S2, a gate layer 120 and a gate dielectric layer 130 are formed above the equalization active region 111, the gate layer 120 includes a gate pattern 121 and a power supply line 122, where the gate pattern 121 is configured for forming a transistor unit with the equalization active region 111, the power supply line 122 electrically connects the equalization active region 111 with an external power supply for supplying power to the transistor unit, and the gate dielectric layer 130 is disposed between the gate layer 120 and the semiconductor substrate 110.

In operation S3, a sidewall protection layer 180 is formed on the sidewalls of the gate layer 120 and the gate dielectric layer 130.

In operation S4, a first dielectric layer 160 is formed on the semiconductor substrate 110, the sidewall protection layer 180 and the gate layer 120.

In operation S5, a contact hole is formed in the first dielectric layer 160, where the contact hole may expose a part of the gate layer 120 and a part of the equalization active region 111.

In operation S6, the interconnection structure 150 is formed in the contact hole.

In operation S7, a second dielectric layer 170 is formed on the interconnection structure 150, the sidewall protection layer 180 and the first dielectric layer 160.

In operation S8, a trace layer 140 is formed on the second dielectric layer 170. The trace layer 140 includes multiple traces.

For specific limitations of the method for manufacturing an equalization circuit structure, reference may be made to the foregoing limitations of the equalization circuit structure, and details are not described herein.

Figure 5:
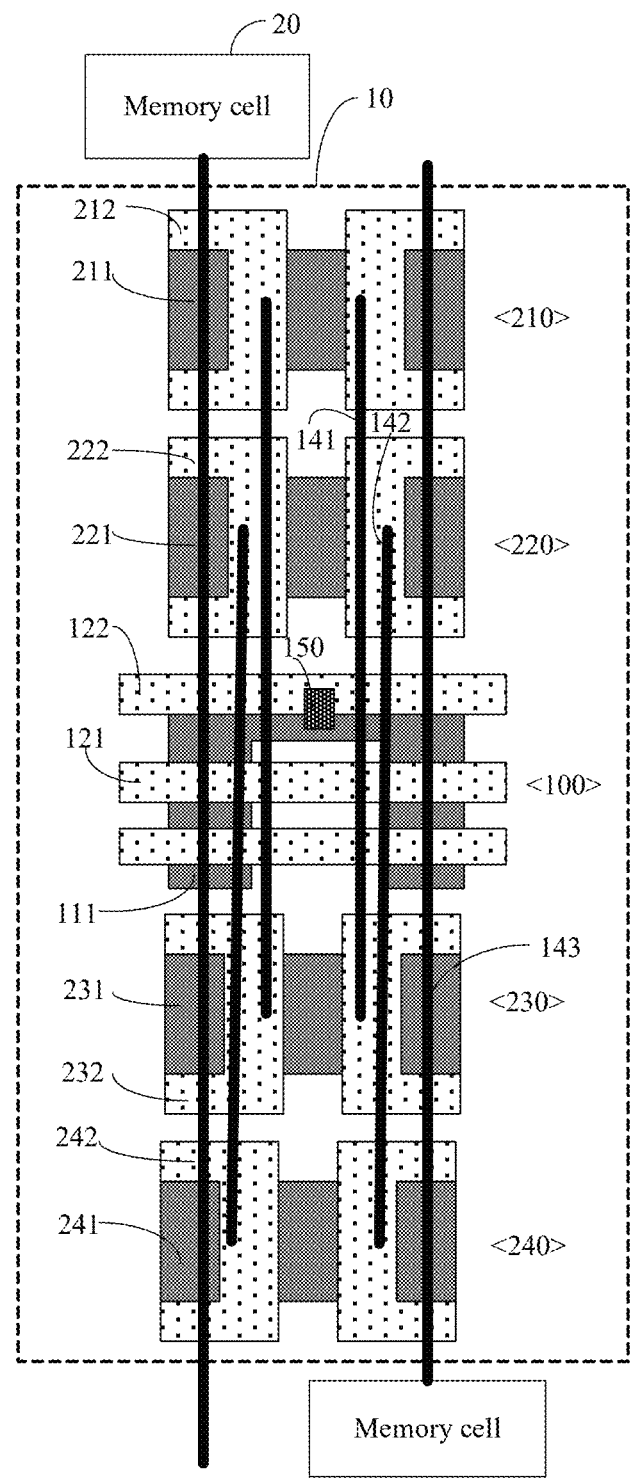
FIG. 5 is a schematic top view of a memory circuit structure according to an embodiment.

In an embodiment, referring to FIG. 5, there is provided a sense amplification circuit structure including an amplification circuit structure and any of the above equalization circuit structures 100.

Specifically, the amplification circuit structure may include a first N-type transistor structure, a first P-type transistor structure, a second N-type transistor structure and a second P-type transistor structure.

Specifically, the amplification circuit structure may also include a semiconductor substrate. The semiconductor substrate may share the same substrate with the equalization circuit structure 100. The amplification circuit structure may include a first N-type active region 211, a second N-type active region 221, a first P-type active region 231 and a second P-type active region 241 in addition to the equalization active region 111.

Furthermore, the amplification circuit structure may also include a gate layer. The gate layer is the same gate layer 120 of the equalization circuit structure 100. The amplification circuit structure may include a first gate 212, a second gate 222, a third gate 232 and a fourth gate 242 in addition to the gate pattern 121.

The first gate 212 is disposed on the first N-type active region 211 for forming the first N-type transistor structure 210. The second gate 222 is disposed on the second N-type active region 221 for forming the second N-type transistor structure 220. The third gate 232 is disposed on the first P-type active region 231 for forming the first P-type transistor structure 230. The fourth gate 242 is disposed on the second P-type active region 241 for forming the second P-type transistor structure 240.

The drain of the first N-type transistor structure is connected with the drain of the first P-type transistor structure and the gate of the first P-type transistor structure, and the gate of the first N-type transistor structure is connected with the memory cell 20. The drain of the second N-type transistor structure is connected with the drain of the second P-type transistor structure and the gate of the first P-type transistor structure, and the second N-type transistor structure is connected with the other memory cell 20.

In this embodiment, the power supply line of the equalization circuit structure 100 is disposed within the gate layer 120, and the trace layer 140 may be used to configure the first trace 141 connecting the first N-type transistor structure and the first P-type transistor structure, and the second trace 142 connecting the second N-type transistor structure and the second P-type transistor structure. Specifically, the first trace 141 may connect the drain of the first N-type transistor structure and the third gate 232 of the first P-type transistor structure. The second trace 142 may connect the drain 222 of the second N-type transistor structure and the fourth gate 242 of the second P-type transistor structure. All traces in the trace layer 140 are connected to the transistors respectively by a connection structure (not shown).

In an embodiment, referring to FIG. 5, there is further provided a memory circuit structure including a memory cell 20 and the aforementioned sense amplification circuit structure 10.

In this case, the trace layer 140 may further include a bit line 143 connecting the amplification circuit structure and the memory cell. Each of the bit line 143, the first trace 141, and the second trace 142 is a trace provided in the trace layer 140.

Specifically, the memory circuit structure may include two memory cells that are complementary to each other, and the trace layer 140 may include two bit lines that are complementary to each other and are respectively connected to the two memory cells. When one of the bit lines is the bit line BL, the other bit line is the complementary bit line BLB.

In the description of this specification, description with reference to the terms "an embodiment", "some embodiments" and the like intends to combine with the specific features, structures, materials or characteristics described in this embodiment or example in at least one of the embodiments or examples in this disclosure. In this specification, the schematic description of the above terms does not necessarily refer to the same embodiments or examples.

The technical features of the above embodiments may be arbitrarily combined. For the sake of brevity of the description, all possible combinations of the technical features of the above embodiments are not described. However, as long as the combinations of the technical features are not contradictory, they should be considered as within the scope of the present specification.

The above examples express only several embodiments of the present disclosure, which are described more specifically and in details, but are not therefore understood as limiting the scope of the disclosure. It is to be noted that, for those of ordinary skill in the art, several modifications and improvements may be made without departing from the concepts of the present disclosure, which fall within the scope of the present disclosure. Accordingly, the scope of protection of the present disclosure shall be subject to the appended claims.

What is claimed is:

1. An equalization circuit structure, comprising:
   a semiconductor substrate including an equalization active region;
   a gate pattern and a power supply line, wherein the gate pattern is disposed on the equalization active region and configured for forming a transistor unit with the equalization active region, and the power supply line electrically connects the equalization active region with an external power supply and is configured for supplying power to the transistor unit; wherein both the gate pattern and the power supply line are set in a gate layer, with the gate pattern and the power supply line arranged in parallel; and
   an interconnection structure connected with both the power supply line and the equalization active region.

2. The equalization circuit structure of claim 1, further comprising a first dielectric layer, wherein the first dielectric layer covers the semiconductor substrate, the gate pattern and the power supply line, and a contact hole is disposed within the first dielectric layer, wherein the interconnection structure is disposed within the contact hole.

3. The equalization circuit structure of claim 2, further comprising a second dielectric layer covering the first dielectric layer and the interconnection structure.

4. The equalization circuit structure of claim 3, further comprising a trace layer, the trace layer comprising a plurality of traces and being disposed on the second dielectric layer.

5. The equalization circuit structure of claim 2, wherein the semiconductor substrate further comprises a shallow trench isolation (STI) structure, and the power supply line is disposed partially on the equalization active region and partially on the STI structure connected with the equalization active region.

6. The equalization circuit structure of claim 1, further comprising a gate dielectric layer disposed between each of the gate pattern and the power supply line and the semiconductor substrate and between the power supply line and the semiconductor substrate.

7. The equalization circuit structure of claim 1, further comprising a sidewall protection layer disposed on the power supply line.

8. The equalization circuit structure of claim 1, wherein the power supply line contacts with the equalization active region.

9. A method for manufacturing an equalization circuit structure, comprising:
   providing a semiconductor substrate having an equalization active region;
   forming a gate pattern and a power supply line on the equalization active region, wherein the gate pattern is configured for forming a transistor unit with the equalization active region, and the power supply line electrically connects the equalization active region with an external power supply and is configured for supplying power to the transistor unit; wherein both the gate pattern and the power supply line are set in a gate layer, with the gate pattern and the power supply line arranged in parallel; and
   forming an interconnection structure connected with both the power supply line and the equalization active region.

10. The method for manufacturing an equalization circuit structure of claim 9, wherein forming the interconnection structure connected with both the power supply line and the equalization active region comprises:
    forming a first dielectric layer on the semiconductor substrate, the gate pattern and the power supply line;
    forming a contact hole within the first dielectric layer;
    forming the interconnection structure within the contact hole.

11. The method for manufacturing an equalization circuit structure of claim 10, further comprising: after forming the interconnection structure within the contact hole,
    forming a second dielectric layer on the first dielectric layer and the interconnection structure.

12. The method for manufacturing an equalization circuit structure of claim 11, further comprising: after forming the second dielectric layer on the first dielectric layer and the interconnection structure,
    forming a trace layer on the second dielectric layer, the trace layer comprising a plurality of traces.

13. A sense amplification circuit structure comprising an amplification circuit structure and the equalization circuit structure of claim 1.

14. A memory circuit structure comprising a memory cell and the sense amplification circuit structure of claim 13.

* * * * *